US010334436B2

(12) United States Patent
Liu et al.

(10) Patent No.: US 10,334,436 B2
(45) Date of Patent: Jun. 25, 2019

(54) METHOD AND DEVICE FOR WIRELESS COMMUNICATION BETWEEN COMMUNICATION TERMINALS

(71) Applicant: Samsung Electronics Co., Ltd., Suwon-si, Gyeonggi-do (KR)

(72) Inventors: Xuheng Liu, Beijing (CN); Qichao Yan, Beijing (CN); Jae-sun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 15/503,912

(22) PCT Filed: Sep. 21, 2015

(86) PCT No.: PCT/KR2015/009895
§ 371 (c)(1),
(2) Date: Feb. 14, 2017

(87) PCT Pub. No.: WO2016/047983
PCT Pub. Date: Mar. 31, 2016

(65) Prior Publication Data
US 2017/0245147 A1 Aug. 24, 2017

(30) Foreign Application Priority Data
Sep. 24, 2014 (CN) .......................... 2014 1 0493944

(51) Int. Cl.
*H04W 12/06* (2009.01)
*H04W 12/08* (2009.01)
(Continued)

(52) U.S. Cl.
CPC ............ *H04W 12/06* (2013.01); *G06F 1/163* (2013.01); *G06F 1/1698* (2013.01);
(Continued)

(58) Field of Classification Search
CPC ..... H04W 12/06; H04W 76/18; H04W 12/08; G06F 1/163; G06F 1/1698; H04M 1/663; H04M 1/7253
See application file for complete search history.

(56) References Cited

U.S. PATENT DOCUMENTS 6,766,160 B1 * 7/2004 Lemilainen ........... H04W 12/06
455/41.2
8,666,315 B2 * 3/2014 Martini ................. H04W 12/02
455/41.2
(Continued)

FOREIGN PATENT DOCUMENTS

CN 103096502 * 5/2013 ............ H04W 76/02
CN 103096502 A 5/2013
(Continued)

OTHER PUBLICATIONS

Chinese Office Action dated Apr. 26, 2017, issued in Chinese Patent Application No. 201410493944.7.
(Continued)

*Primary Examiner* — Kambiz Zand
*Assistant Examiner* — Tongoc Tran
(74) *Attorney, Agent, or Firm* — Jefferson IP Law, LLP

(57) ABSTRACT

Provided is a device that performs wireless communication with a second communication terminal via a server, the device including a communication determiner that determines whether to perform communication in a long-range wireless communication mode, which is a communication mode for communicating with the second communication terminal by using the server; a communicator, which based on the determination, transmits a connection request to the server and receives a response message including authentication information for establishing communication with the second communication terminal from the server; and a controller, which controls the first communication terminal (Continued)

to perform wireless communication with the second communication terminal in response to the response message.

13 Claims, 11 Drawing Sheets

(51) Int. Cl.
| | | |
|---|---|---|
| *H04W 76/18* | (2018.01) | |
| *G06F 1/16* | (2006.01) | |
| *H04M 1/663* | (2006.01) | |
| *H04M 1/725* | (2006.01) | |
| *H04L 29/06* | (2006.01) | |
| *H04W 88/06* | (2009.01) | |

(52) U.S. Cl.
CPC ......... *H04M 1/663* (2013.01); *H04M 1/7253* (2013.01); *H04W 12/08* (2013.01); *H04W 76/18* (2018.02); *H04L 63/08* (2013.01); *H04M 2250/02* (2013.01); *H04W 88/06* (2013.01)

(56) References Cited

U.S. PATENT DOCUMENTS

| | | |
|---|---|---|
| 8,848,670 B2 | 9/2014 | Jang |
| 8,983,871 B2 | 3/2015 | Lee et al. |
| 9,497,307 B2 | 11/2016 | Jiang |
| 2002/0132638 A1 | 9/2002 | Plahte et al. |
| 2003/0124979 A1* | 7/2003 | Tanada .................. H04W 84/20 455/41.1 |
| 2005/0003822 A1* | 1/2005 | Aholainen ............ H04W 28/18 455/445 |
| 2006/0234631 A1* | 10/2006 | Dieguez ................ H04W 76/14 455/41.2 |
| 2007/0104180 A1 | 5/2007 | Aizu et al. |
| 2007/0287420 A1 | 12/2007 | Kirke |
| 2013/0237151 A1 | 9/2013 | Yu et al. |
| 2013/0288604 A1 | 10/2013 | Chang et al. |
| 2014/0167931 A1 | 6/2014 | Lee et al. |
| 2014/0237125 A1 | 8/2014 | Zhou et al. |

FOREIGN PATENT DOCUMENTS

| | | | | |
|---|---|---|---|---|
| CN | 103118091 | * | 5/2013 | ............. H04L 29/06 |
| CN | 103118091 A | | 5/2013 | |
| CN | 103412476 | * | 11/2013 | ............. G04G 21/04 |
| CN | 103412476 A | | 11/2013 | |
| CN | 103491217 A | | 1/2014 | |
| CN | 103796333 | * | 5/2014 | ............. H04W 76/02 |
| CN | 103796333 A | | 5/2014 | |
| CN | 103901769 | * | 7/2014 | ............. G01C 17/00 |
| CN | 103901769 A | | 7/2014 | |
| KR | 10-2014-0011900 A | | 1/2014 | |
| WO | 2008/101289 A1 | | 8/2008 | |
| WO | 2010/067954 A | | 6/2010 | |
| WO | 2012/070801 A | | 5/2012 | |
| WO | 2012/102471 A | | 8/2012 | |
| WO | 2014/098477 A | | 6/2014 | |

OTHER PUBLICATIONS

Chinese Office Action dated Nov. 16, 2017, issued in Chinese Patent Application No. 201410493944.7.
Chinese Office Action dated Apr. 13, 2018, issued in Chinese Patent Application No. 201410493944.7.
Chinese Office Action dated Nov. 1, 2018, issued in Chinese Patent Application No. 201410493944.7.
Chinese Office Action dated Feb. 1, 2019, issued in Chinese Patent Application No. 201410493944.7.

\* cited by examiner

METHOD AND DEVICE FOR WIRELESS COMMUNICATION BETWEEN COMMUNICATION TERMINALS

TECHNICAL FIELD

The present invention relates to a communication technology, and more particularly, to a method and an apparatus for wireless communication between communication terminals.

BACKGROUND ART

Along with developments in information technologies, various smart wearable devices (e.g., smart watches, smart glasses, smart bracelets, etc.) are becoming popular. Accordingly, smart wearable devices may be used as accessories for providing some of functions and/or information regarding communication devices (e.g., smart phones, tablet personal computers (PCs), multimedia terminals, etc.) by communicating with the communication devices. For example, a user may make a phone call and transmit or receive a message by using a smart wearable device.

Generally, a short-range communication module, such as a Bluetooth module, is used for a wearable device to communicate with other communication devices, but there are various limits in short-range communication. For example, when a smart wearable device is located far from a communication device or when there is an obstacle affecting short-range communication between a smart wearable device and a communication device, the short-range communication may not be performed normally. Therefore, a user may not be able to interact effectively with a communication device through a smart wearable device.

DETAILED DESCRIPTION OF THE INVENTION

Technical Problem

The present disclosure provides a method and an apparatus for wireless communication between communication terminals.

Technical Solution

According to an aspect of the present disclosure, there is provided a first communication terminal that performs wireless communication with a second communication terminal via a server, the first communication terminal including a communication determiner that determines whether to perform a communication in a long-range wireless communication mode, which is a communication mode for communicating with the second communication terminal by using the server; a communicator, which, based on the determination, transmits a connection request to the server and receives a response message including authentication information for establishing a communication with the second communication terminal from the server; and a controller, which controls the first communication terminal to perform wireless communication with the second communication terminal in response to the response message, wherein the authentication information may include information regarding a result of authentication determined based on whether the first communication terminal is included in a list of trusted devices of the second communication terminal.

The connection request may include identification information regarding the second communication terminal and identification information regarding the first communication terminal, and the identification information regarding the first communication terminal may include authentication information for short-range wireless communication and/or long-range wireless communication of the first communication terminal.

The list of trusted devices of the second communication terminal may include information regarding communication terminals that have previously perform short-range wireless communications with the second communication terminal.

The communicator may transmit a control signal of the second communication terminal based on a user input to the server, and the response message may include information regarding a result of performing at least some of functions of the second communication terminal according to the control signal.

The at least some of functions may include one of a phone call transmitting function, a phone call receiving function, a message transmitting function, and a message receiving function.

The first communication terminal may further include a converter, which converts a voice signal to a data packet and converts a data packet to a voice signal, wherein the communicator may transmit the data packet converted from the voice signal to the server and receive a data package converted from a voice signal by the second communication terminal from the server.

The communication determiner may determine whether to perform a long-range wireless communication mode when there is data that needs to be transmitted to the second communication terminal or when the second communication terminal is disconnected.

The first communication terminal may further include an authenticator, which requests the server to authenticate the first communication terminal by transmitting account information, wherein the communicator may perform data interaction with the second communication terminal authenticated by the server via the server.

According to an aspect of the present disclosure, there is provided a server via which a first communication terminal and a second communication terminal to perform wireless communication, the server including a receiver, which receives a connection request from the first communication terminal and receives a response message from the second communication terminal; an address determiner, which determines a network address of the second communication terminal based on the connection request; and a transmitter, which transmits the connection request to the second communication terminal based on the determined network address and transmits the response message to the first communication terminal.

The server may further include an authenticator, which authenticates establishment of communication based on whether the first communication terminal is included in a list of trusted devices of the second communication terminal and generates authentication information, wherein the transmitter may transmit a connection request including the authentication information to the second communication terminal.

According to an aspect of the present disclosure, there is provided a method by which a first communication terminal performs wireless communication with a second communication terminal via a server, the method including determining whether to perform a communication in a long-range wireless communication mode, which is a communication mode for communicating with the second communication terminal by using the server; based on the determination, transmitting a connection request to the server; receiving a response message including authentication information for establishing a communication with the second communication terminal from the server; and controlling the first communication terminal to perform wireless communication with the second communication terminal in response to the response message, wherein the authentication information may include information regarding a result of authentication determined based on whether the first communication terminal is included in a list of trusted devices of the second communication terminal.

The connection request may include identification information regarding the second communication terminal and identification information regarding the first communication terminal, and the identification information regarding the first communication terminal may include authentication information for short-range wireless communication and/or long-range wireless communication of the first communication terminal.

The list of trusted devices of the second communication terminal may include information regarding communication terminals that have previously perform short-range wireless communications with the second communication terminal.

In the transmitting, a control signal of the second communication terminal based on a user input may be transmitted to the server, and the response message may include information regarding a result of performing at least some of functions of the second communication terminal according to the control signal.

The method may further include transmitting a data packet converted from a voice signal to the server; receiving a data package converted from a voice signal by the second communication terminal from the server; and converting the data packet received from the server to a voice signal.

In the determining, it may be determined whether to perform a long-range wireless communication mode when there is data that needs to be transmitted to the second communication terminal or when the second communication terminal is disconnected.

The method may further include requesting the server to authenticate the first communication terminal by transmitting account information; and performing data interaction with the second communication terminal authenticated by the server via the server.

According to an aspect of the present disclosure, there is provided a method by which a first communication terminal and a second communication terminal perform wireless communication, the method including receiving a connection request from the first communication terminal; determining a network address of the second communication terminal based on the connection request; transmitting the connection request to the second communication terminal based on the determined network address; receiving a response message from the second communication terminal; and transmitting the response message to the first communication terminal.

The method may further include authenticating establishment of communication based on whether the first communication terminal is included in a list of trusted devices of the second communication terminal and generating authentication information, wherein, in the transmitting of the connection request to the second communication terminal, a connection request including the authentication information may be transmitted to the second communication terminal.

According to an aspect of the present disclosure, there is provided a non-transitory computer readable recording medium having recorded thereon a computer program for implementing a method by which a first communication terminal performs wireless communication with a second communication terminal via a server.

MODE OF THE INVENTION

With respect to the terms used in the various embodiments of the present disclosure, general terms which are currently and widely used are selected in consideration of functions of structural elements in the various embodiments of the present disclosure. However, meanings of the terms may be changed according to an intention, a judicial precedent, appearance of new technology, and the like. In addition, in certain cases, a term which is not commonly used may be selected. In such a case, the meaning of the term will be described in detail at the corresponding part in the description of the present disclosure. Therefore, the terms used in various embodiments of the present disclosure should be defined based on the meanings of the terms and the descriptions provided herein.

Throughout the specification, it will be understood that when a portion is referred to as being "connected to" another portion, it can be "directly connected to" the other portion or "electrically connected to" the other portion via another element. In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof. Also, while such terms as "first," "second," etc., may be used to describe various components, such components must not be limited to the above terms. The above terms are used only to distinguish one component from another.

Throughout the specification, the term 'communication device' may include a device 200, such as a personal computer (PC), a cellular phone, a smart phone, a TV, a tablet, a notebook, a personal digital assistant (PDA), a portable multimedia player (PMP), a navigation device, an MP3 player, and a digital camera, but is not limited thereto.

Throughout the specification, a smart wearable device may include a watch, a bracelet, a ring, an eyeglass, and a hair band having a communication function and a data processing function, but is not limited thereto.

Hereinafter, the present disclosure will be described in detail with reference to the attached drawings.

Figure 1:
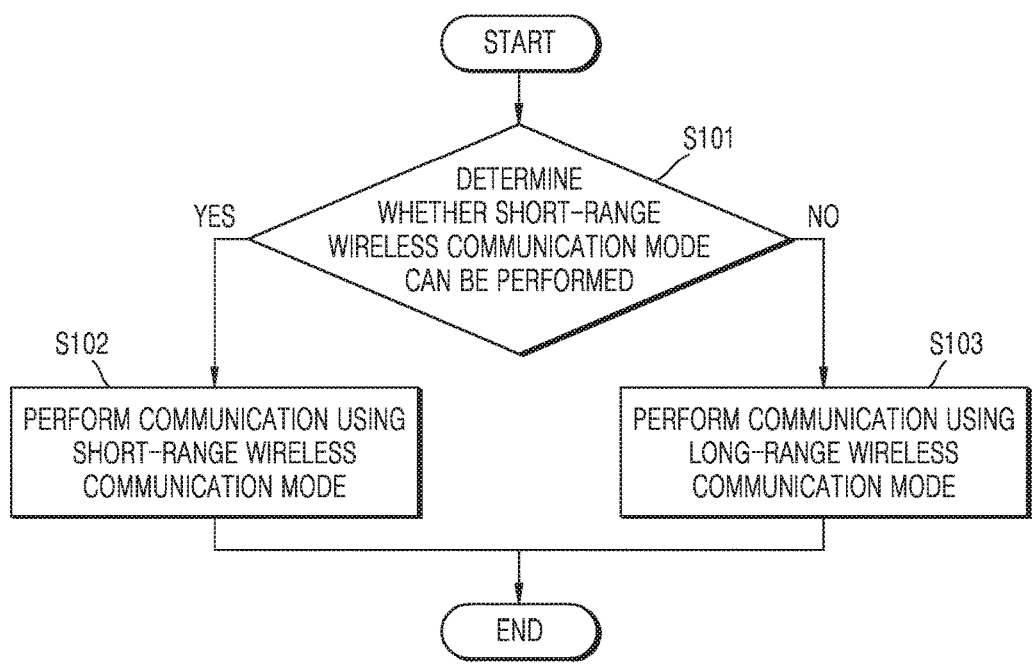
FIG. 1 is a flowchart for describing a method of wireless communication between communication terminals, according to some embodiments of the present disclosure.

FIG. 1 is a flowchart for describing a method of wireless communication between communication terminals, according to some embodiments of the present disclosure.

According to some embodiments, a first communication terminal is an accessory for a second communication terminal, is capable of controlling at least some of functions of the second communication terminal (e.g., sending a phone call, receiving a phone call, transmitting a message, receiving a message, etc.), and/or is capable of displaying at least a portion of information received at the second communication terminal (e.g., a message received and transmitted by the second communication terminal or a phone call receiving event). For example, the first communication terminal may be a smart wearable device (e.g., a smart watch, a smart glasses, a smart bracelet, etc.), whereas the second communication terminal may be a communication device using the first communication terminal as an attachment device (e.g., a smart phone, a tablet PC, a multimedia terminal, etc.).

Here, short-range wireless communication may include Bluetooth communication, infrared communication, near-field communication (NFC), and WIFI direct communication.

According to some embodiments, when it is determined that data at the first communication terminal needs to be transmitted to the second communication terminal, operation S101 is performed.

Furthermore, according to some embodiments, when a connection is established between the first communication terminal and the second communication terminal and the established connection is abnormally disconnected, operation S101 is performed. Here, the abnormal disconnection refers to a disconnection that is not performed or requested by a user.

When it is determined in the operation S101 that the first communication terminal is capable of performing short-range wireless communication with the second communication terminal, the first communication terminal communicates with the second communication terminal by using a short-range wireless communication mode. In other words, the first communication terminal directly communicates with the second communication terminal by using its own short-range communication module.

When it is determined in the operation S101 that the first communication terminal is unable to perform short-range wireless communication with the second communication terminal, the first communication terminal communicates with the second communication terminal by using a long-range wireless communication mode.

Here, the long-range wireless communication mode includes a mode using a long-range wireless communication module and/or a mode using a short-range wireless communication module and a relay device.

Here, the mode using the long-range wireless communication module refers to a mode in which communication is performed by directly using a long-range wireless communication module (e.g., a cellular communication module) included in the first communication terminal.

For example, the first communication terminal may access the internet by using an operator's wireless data network, thereby communicating with the second communication terminal that is accessing the internet.

Meanwhile, the mode using a short-range wireless communication module and a relay device refers to a mode for connecting to a relay device by using a short-range wireless communication module (e.g., a Bluetooth module, an infrared module, an NFC module, a WIFI module, etc.) included in the first communication terminal, thereby performing long-range wireless communication with the support of a communication function of the relay device.

For example, the first communication terminal may access a network via an access point (AP) by using a WIFI module, thereby communicating with a second communication terminal that is accessing the network. Furthermore, the first communication terminal may access a network via a communication terminal sharing a Bluetooth internet access function by using a Bluetooth module, thereby communicating with the second communication terminal that is accessing the network.

At this time, the first communication terminal uses a currently established connection with the second communication terminal to control the second communication terminal in order to perform some of functions of the second communication terminal and/or to display at least a part of information.

For example, the at least some of the functions include at least one of a phone call transmitting function, a phone call receiving function, a message transmitting function, and a message receiving function. Furthermore, at least a portion of information includes at least one of a message received and transmitted by the second communication terminal and a phone call receiving event. At this time, the phone call receiving event may be a missing phone call event, an event for responding to a phone call receiving event, or the like.

In the case of communicating with the second communication terminal by using the long-range wireless communication mode, when the first communication terminal knows the network address of the second communication terminal (e.g., an address for long-range wireless communication of the second communication terminal like an IP address), it is convenient to establish a connection between the first and second communication terminals. However, when the first communication terminal does not know the network address of the second communication terminal, no connection may be established. An example of a method of establishing a connection between communication terminals during long-range wireless communication is described below with reference to FIG. 2.

Figure 2:
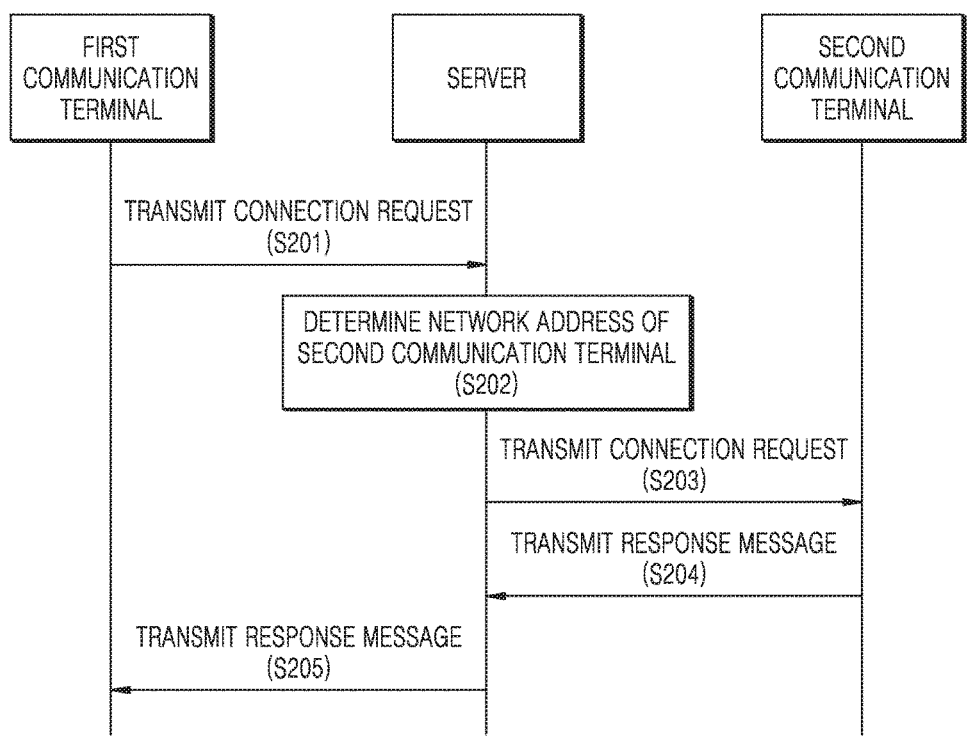
FIG. 2 is a diagram showing a method of establishing a connection between communication terminals during long-range wireless communication, according to some embodiments of the present disclosure.

FIG. 2 is a diagram showing a method of establishing a connection between communication terminals during long-range wireless communication, according to some embodiments of the present disclosure.

In operation S201, a first communication terminal transmits, to a server, a connection request to be connected to a second communication terminal, where the connection request includes identification information regarding the second communication terminal.

The identification information regarding the second communication terminal may include identification information (e.g., the physical address of a short-range communication module of the second communication terminal, such as a MAC (Media Access Control) address) for short-range wireless communication and/or identification information (e.g., identification information regarding a long-range communication module of the second telecommunication terminal, such as an International Mobile Equipment Identity (IMEI) or a phone number) for long-range wireless communication. It may be understood that identification information regarding the second communication terminal is not limited thereto and other identification information may also be employed.

At this time, the network address of the server may be stored in advance in the first communication terminal and, when long-range wireless communication with the second communication terminal is to be performed, the first communication terminal may transmit a connection request to the server.

In operation S202, the server determines the network address of the second communication terminal according to identification information regarding the second communication terminal in the connection request.

For example, the server may store identification information related to the network address of the second communication terminal in advance, in order to search for the network address of the second communication terminal based on identification information regarding the second communication terminal.

In operation S203, the server transmits a connection request to the second communication terminal.

In operation S204, the second communication terminal may transmit a response message, which indicates whether the connection request is acceptable, to the server.

In operation S205, the server forwards the response message from the second communication terminal to the first communication terminal.

Therefore, when a response message indicating that the first communication terminal accepts the connection request is received, a connection between the first and second communication terminals may be established.

Furthermore, a connection between the first and second communication terminals may be a point-to-point connection. In this case, a point-to-point communication between the first and second communication terminals may be performed by using the network address of the first communication terminal obtained according to a connection request of the second communication terminal and the network address of the second communication terminal obtained according to a connection request of the first communication terminal.

Furthermore, a connection between the first and second communication terminals may be a connection via the server. In other words, communication data between the first and second communication terminals may be forwarded by the server. For example, after a connection is established, when the server receives data to be transmitted to the second communication terminal by the first communication terminal (the data may additionally include identification information regarding the second communication terminal), the network address of the second communication terminal is determined according to the identification information regarding the second communication terminal, and then the data is transmitted to the second communication terminal. When the server receives data to be transmitted to the first communication terminal by the second communication terminal (data may additionally include the identification information regarding the first communication terminal), the network address of the first communication terminal is determined according to the identification information regarding the first communication terminal, and then the data is transmitted to the first communication terminal.

In the case of communicating with the second communication terminal in the long-range wireless communication mode, it is authenticated whether the first communication terminal is a trusted device for the second communication terminal based on identification information regarding the first communication terminal. The identification information regarding the first communication terminal may be included in a connection request transmitted to the second communication terminal.

When the first communication terminal is a trusted device for the second communication terminal, the second communication terminal is allowed to establish a connection with the first communication terminal. However, when the first communication terminal is not a trusted device for the second communication terminal, the second communication terminal is not allowed to establish a connection with the first communication terminal. In other words, when the first communication terminal is a trusted device for the second communication terminal, the second communication terminal generates and transmits a response message indicating that a connection request is accepted. However, when the first communication terminal is not a trusted device for the second communication terminal, the second communication terminal generates and transmits a response message indicating that a connection request is not accepted. In other words, when the first communication terminal is a trusted device for the second communication terminal, the second communication terminal may authenticate the first communication terminal as its own accessory, and thus the first communication terminal is allowed to control the second communication terminal.

At this time, the identification information regarding the first communication terminal may include identification information (e.g., the physical address of a short-range communication module of the first communication terminal, such as a MAC address) for short-range wireless communication and/or identification information (e.g., identification information regarding a long-range communication module of the first telecommunication terminal, such as an International Mobile Equipment Identity PIP or a phone number) for long-range wireless communication.

According to some embodiments, authentication is performed by the second communication terminal to determine whether the first communication terminal is a trusted device for the second communication terminal by searching for the identification information regarding the first communication terminal in a list of the trusted devices. When the identification information regarding the first communication terminal is included in the list of trusted devices, the first communication terminal is authenticated as a trusted device for the second communication terminal. However, when the identification information regarding the first communication terminal is not in the list of trusted devices, the first communication terminal is not authenticated as a trusted device for the second communication terminal.

At this time, the list of trusted devices may include identification information regarding other communication terminals, which have previously established short-range wireless communication with the second communication terminal, for establishing short-range wireless communication with the second communication terminal. In other words, authentication is performed to determine whether the first communication terminal is a trusted device for the second communication terminal by determining whether the first communication terminal has previously established short-range wireless communication with the second communication terminal. When the first communication terminal has previously established short-range wireless communication with the second communication terminal, the first communication terminal is authenticated as a trusted device for the second communication terminal.

At this time, the authentication may be performed by the server or the second communication terminal.

When authentication is performed by the server, the server transmits a connection request together with a result of authentication regarding the first communication terminal in operation S203. In operation S204, the second communication terminal may generate and transmit a response message according to the result of the authentication performed by the server.

When authentication is performed by the second communication terminal, the second communication terminal performs the authentication in operation S204 and generates and transmits a response message according to a result of the authentication.

In the embodiment shown in FIG. 2, in the case of communicating with the second communication terminal using the long-range wireless communication mode, data interactions between communication terminals may be performed based on identification information regarding the communication terminals.

Furthermore, according to some embodiments, data interaction between communication terminals may be performed based on account information regarding the communication terminals. For example, in order to communicate with a second communication terminal that logged into a predetermined server by using same account information, the first communication terminal may log into the predetermined server by using account information using the long-range wireless communication mode. At this time, after both the first and second communication terminals logged into the predetermined server by using the same account information, a connection between the first and second communication terminals is established via the server. Thereafter, data interaction between the first and second communication terminals may be performed via the established connection.

It may be understood that the account information may be used as identification information regarding the first and second communication terminals.

Figure 3:
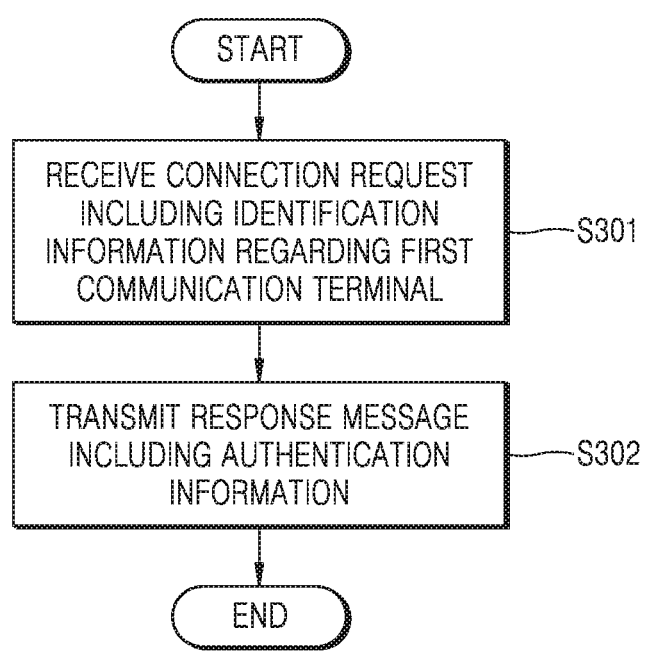
FIG. 3 is a flowchart of a method for wireless communication between communication terminals via a server, according to some embodiments of the present disclosure.

FIG. 3 is a flowchart of a method of wireless communication between communication terminals via a server, according to some embodiments of the present disclosure.

In operation S301, a second communication terminal receives a connection request from a first communication terminal. At this time, the connection request includes the identification information regarding the first communication terminal. Here, since the identification information regarding the first communication terminal is identical to that described above, a detailed description thereof will be omitted.

Furthermore, according to some embodiments, the identification information regarding the first communication terminal may be identification information regarding the first communication terminal for short-range wireless communication (e.g., the physical address of the short-range communication module of the first communication terminal).

In operation S302, a response message regarding the connection request is transmitted to the first communication terminal in order to establish a connection between the first and second communication terminals.

The response message includes a result of determining whether the first communication terminal is successfully authenticated, based on the identification information included in the connection request.

At this time, the response message may be generated by the server or the second communication terminal.

According to some embodiments in which a response message is generated by the server, when the response message indicates that the first communication terminal is successfully authenticated, the server establishes a connection between the first and second communication terminals. At this time, identification information regarding the first communication terminal and identification information regarding the second communication terminal may be the same account information. When the first communication terminal logged into the server based on account information using the long-range wireless communication mode (e.g., if the account information is authenticated by the server), it is determined that the first communication terminal is successfully authenticated.

According to some embodiments in which a response message is generated by the second communication terminal, in operation S302, the server transmits a connection request received from the first communication terminal to the second communication terminal and transmits a response message received from the second communication terminal to the first communication terminal.

Meanwhile, when identification information regarding the first communication terminal is in a list of the identification information regarding trusted devices, it is determined that the first communication terminal is successfully authenticated, and thus the first communication terminal is authenticated as the trusted device of the second communication terminal. The identification information regarding trusted devices includes authentication information for establishing the short-range wireless communication regarding communication terminals that have previously established short-range wireless communication with the second communication terminal.

At this time, the authentication may be performed by the server or the second communication terminal.

When authentication is performed by the server, the server transmits a connection request according to a result of the authentication to the second communication terminal, such that the second communication terminal generates and transmits a response message according to the result of the authentication performed by the server. When authentication is performed by the second communication terminal, the second communication terminal performs the authentication in response to a connection request and generates and transmits a response message according to a result of the authentication.

Furthermore, when the server communicates with the second communication terminal (e.g., when transmitting a connection request received from the first communication terminal to the second communication terminal), the server determines an address for long-range wireless communication of the second communication terminal based on the identification information of the second communication terminal included in the connection request. For example, the server may search for an address that matches the identification information in a predetermined database. At this time, the predetermined database stores identification information related to the address for long-range wireless communication of the second communication terminal.

After a connection between the first and second communication terminals is established, the server transmits data to be transmitted to the second communication terminal from the first communication terminal to the second communication terminal or data to be transmitted to the first communication terminal from the second communication terminal to the first communication terminal.

According to some embodiments, the server performs address translation when data is transmitted from the first and second communication terminals. For example, the server determines an address for long-range wireless communication of the second communication terminal based on identification information regarding the second communication terminal. Next, when data to be transmitted from the first communication terminal to the second communication terminal is received. The data to be transmitted from the first communication terminal to the second communication terminal may further include identification information regarding the second communication terminal in order to transmit the data to be transmitted from the first communication terminal to the second communication terminal to a predetermined address. Furthermore, in terms of data to be transmitted from the second communication terminal to the first communication terminal, the server additionally determines an address for long-range wireless communication of the first communication terminal based on identification information regarding the first communication terminal. Next, when the data to be transmitted from the second communication terminal to the first communication terminal is received, the data to be transmitted from the second communication terminal to the first communication terminal may further include the identification information regarding the first communication terminal in order to transmit the data to be transmitted from the second communication terminal to the first communication terminal to a predetermined address. It may be understood that, when a connection is established, the server may obtain an address for long-range wireless communication of the first communication terminal (e.g., from a connection request) and store an identifier related to the address for long-range wireless communication of the first communication terminal.

Furthermore, according to some embodiments, after a connection is established between the first and second communication terminals, address translation is not required for communication between the first and second communication terminals. However, transmission of data received from the first communication terminal to the second communication terminal and transmission of data received from second communication terminal to the first communication terminal are basic technical features.

Figure 4:
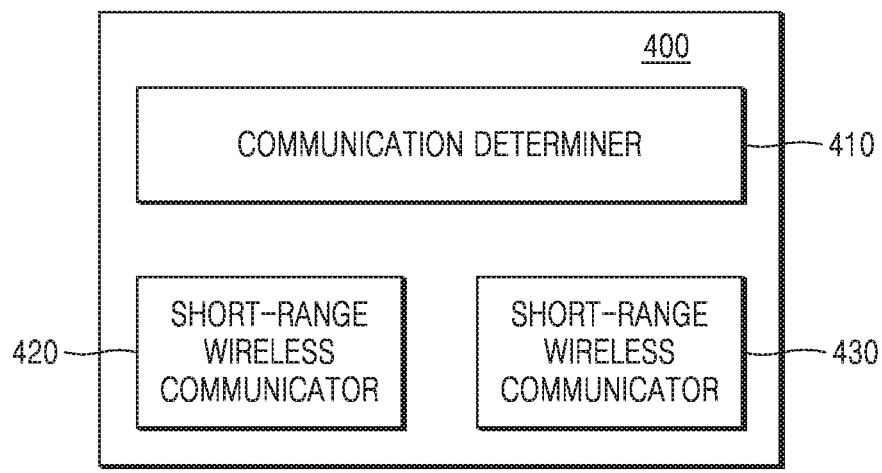
FIG. 4 is a block diagram showing an apparatus for wireless communication between communication terminals, according to some embodiments of the present disclosure.

FIG. 4 is a block diagram showing an apparatus for wireless communication between communication terminals, according to some embodiments of the present disclosure.

As shown in FIG. 4, an apparatus 400 for wireless communication between communication terminals, according to some embodiments of the present disclosure, includes a communication detector 410, a short-range communicator 420, and a long-range wireless communicator 430.

The communication detector 410 determines whether a first communication terminal is capable of performing short-range wireless communication with a second communication terminal.

According to some embodiments, the communication detector 410 determines whether the first communication terminal is capable of performing short-range wireless communication with the second communication terminal only when the first communication terminal includes data that needs to be transmitted to the second communication terminal.

Furthermore, according to some embodiments, the communication detector 410 determines whether the first communication terminal is capable of performing short-range wireless communication with the second communication terminal only when a connection between the first and second communication terminals is abnormally disconnected after the connection is established between the first and second communication terminals.

The short-range communicator 420 communicates with the second communication terminal in a short-range wireless communication mode. When the communication detector 410 determines that the first communication terminal is capable of performing short-range wireless communication with the second communication terminal, the short-range communicator 420 communicates with the second communication terminal in the short-range wireless communication mode.

The long-range wireless communicator 430 communicates with the second communication terminal in a long-range wireless communication mode. When the communication detector 410 determines that the first communication terminal is unable to perform short-range wireless communication with the second communication terminal, the long-range wireless communicator 430 communicates with the second communication terminal in the long-range wireless communication mode.

The long-range wireless communication mode includes a mode using a long-range wireless communication module and/or a mode using a short-range wireless communication module and a relay device.

Furthermore, according to some embodiments, the long-range wireless communicator 430 transmits a request for connection to the second communication terminal to a server and receives a response message indicating whether the request for connection is accepted from the server. Here, the request for connection includes identification information regarding the second communication terminal. Here, identification information regarding the first communication terminal is used for authentication regarding whether the first communication terminal is a trusted device for the second communication terminal.

Furthermore, according to some embodiments, when the long-range wireless communicator 430 communicates with the second communication terminal using the long-range wireless communication module, the long-range wireless communicator 430 performs a data interaction with the second communication terminal based on account information.

Meanwhile, the long-range wireless communicator 430 may log into a predetermined server based on account information in order to communicate with the second communication terminal logged into the predetermined server by using the same account information. After both the first and second communication terminals log into the predetermined server based on the same account information, a connection between the first and second communication terminals may be established via the server. At this time, a data interaction between the first and second communication terminals may be performed via the established connection.

According to some embodiments, the apparatus 400 for wireless communication between communication terminals may include a controller in order to perform at least some of functions of the second communication terminal using any usable one of short-range wireless communication mode and long-range wireless communication mode and/or to display at least a part of information.

Figure 5:
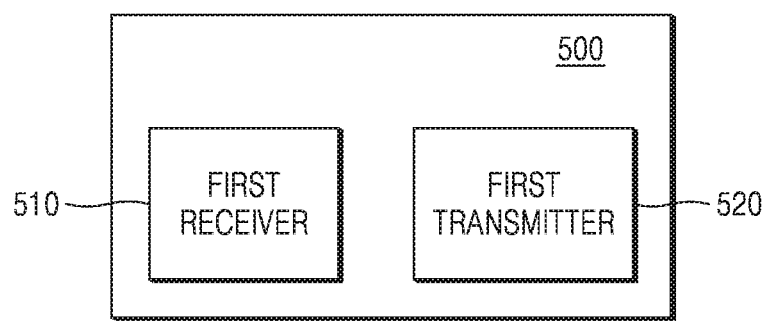
FIG. 5 is a block diagram showing an apparatus for wireless communication between communication terminals via a server, according to some embodiments of the present disclosure.

FIG. 5 is a block diagram showing an apparatus for wireless communication between communication terminals via a server, according to some embodiments of the present disclosure.

As shown in FIG. 5, an apparatus 500 for connecting wireless communication between communication terminals, according to some embodiments of the present disclosure, includes a first receiver 510 and a first transmitter 520.

The first receiver 510 receives a request for connection with the second communication terminal from the first communication terminal, wherein the request for connection includes identification information regarding the first communication terminal.

The first transmitter 520 transmits a response message regarding the request for connection to the first communication terminal in order to establish a connection between the first and second communication terminals. The response message includes a result of determining whether the first communication terminal has been successfully authenticated based on the identification information regarding the first communication terminal included in the request for connection.

Meanwhile, the response message may be generated by either the server or the second communication terminal.

According to some embodiments in which a response message is generated by the server, the apparatus 500 for connecting wireless communication between communication terminals may further include a connector and an authenticator. Here, identification information regarding the first communication terminal and identification information regarding the second communication terminal may be same account information. In particular, the authenticator is used to confirm account information. When the first communication terminal logs into the server based on account information using long-range wireless communication mode (account information transmitted by the first communication terminal is successfully authenticated by the server), the authenticator determines whether the first communication terminal is successfully authenticated and generates a response message indicating that the first communication terminal is successfully authenticated. After the first communication terminal is successfully authenticated, the connector may establish a connection between the first and second communication terminals.

According to some embodiments in which a response message is generated by the second communication terminal, the apparatus 500 for connecting wireless communication between communication terminals may further include an authenticator, a second transmitter, and a second receiver.

In particular, the authenticator may determine whether the first communication is successfully authenticated based on the identification information regarding the first communication terminal and the identification information regarding the second communication terminal included in the request for connection. When the identification information regarding the first communication terminal is in a list of the identification information regarding trusted devices, it is determined whether the first communication terminal is successfully authenticated, thereby authenticating the first communication terminal as a trusted device for the second communication terminal. Here, the list of trusted devices may include identification information for establishing short-range wireless communication with the communication terminals that have previously established short-range wireless communication with the second communication terminal.

Furthermore, the second transmitter may use an address for long-range wireless communication of the second communication terminal to transmit a request for connection and a result of authentication to the second communication terminal, such that the second communication terminal may generate and transmit a response message according a result of authentication received from the server.

Furthermore, according to some embodiments, authentication procedure may be performed at the second communication terminal. At this time, the apparatus 500 for connecting wireless communication between communication terminals may not include an authenticator. At this time, the second transmitter transmits a request for connection to the second communication terminal using an address for long-range wireless communication of the second communication terminal. The second receiver receives a response message from the second communication terminal.

Furthermore, according to some embodiments, the apparatus 500 for connecting wireless communication between communication terminals may further include an address determiner 1301. Here, the address determiner 1301 determines an address for long-range wireless communication of the second communication terminal based on identification information regarding the second communication terminal included in a request for connection. For example, the server may search for an address that matches identification information in a predetermined database. Here, the predetermined database stores identification information related to the address for the long-range wireless communication of the second communication terminal. Therefore, when the second transmitter communicates with the second communication terminal (in the case of transmitting a request for connection received from the first communication terminal to the second communication terminal), the second transmitter communicates with the second communication terminal by using the determined address for long-range wireless communication of the second communication terminal.

Meanwhile, after a connection between the first and second communication terminals is established, the second transmitter may transmit data received terminal from the first communication terminal by the first communicator to the second communication. Furthermore, the first transmitter may transmit data received from the second communication terminal by the second receiver to the first communication terminal.

According to some embodiments, when data is transmitted from the first and second communication terminals, the server performs address translation. For example, when data to be transmitted from the first communication terminal to the second communication terminal is received, the address determiner determines an address for long-range wireless communication of the second communication terminal based on identification information regarding the second communication terminal and, for the second transmitter to transmit the data to the determined address, the data to be transmitted from the first communication terminal to the second communication terminal may further include identification information regarding the second communication terminal. When data to be transmitted from the second communication terminal to the first communication terminal is received, the address determiner determines an address for long-range wireless communication of the first communication terminal based on identification information regarding the first communication terminal and, for the second transmitter to transmit the data to the determined address, the data to be transmitted from the second communication terminal to the first communication terminal may further include identification information regarding the first communication terminal. It is clear that, when a connection is established, the first receiver 510 of the server may obtain an address for long-range wireless communication of the first communication terminal and store an identifier related to the address for long-range wireless communication of the first communication terminal.

Meanwhile, according to some embodiments, after a connection between the first and second communication terminals is established, address translation is not required for communication between the first and second communication terminals. However, transmission of data received from the first communication terminal to the second communication terminal and transmission of data received from second communication terminal to the first communication terminal are basic technical features. As shown in FIGS. 6 through 9, after a connection is established between the first and second communication terminals, according to some embodiments of the present disclosure, a method by which the first communication terminal performs a phone call function of the second communication terminal as an accessory of the second communication terminal is described below.

Figure 6:
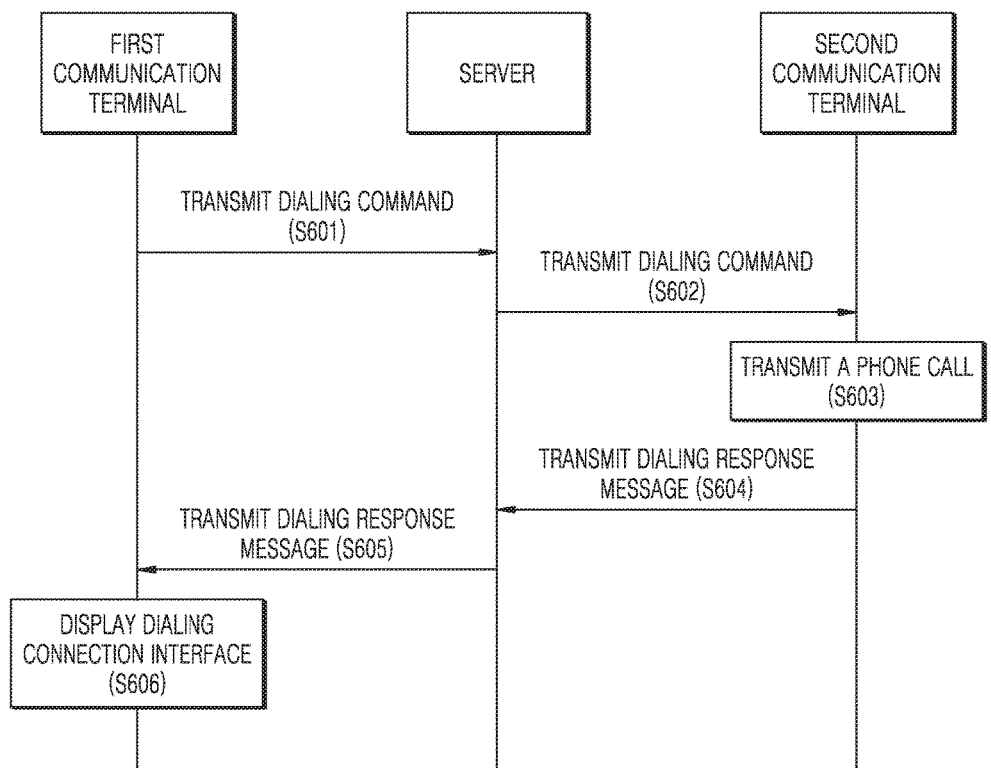
FIG. 6 is a diagram showing a method by which a first communication terminal makes a phone call by using a second communication terminal, according to some embodiments of the present disclosure.

FIG. 6 is a diagram showing a method by which a first communication terminal makes a phone call by using a second communication terminal, according to some embodiments of the present disclosure.

In operation S601, the first communication terminal transmits a dialing command to a server. A dialing command may include a dialing instruction and a telephone number. For example, a dialing command may be generated in response to a dialing operation performed at the first communication terminal.

In operation S602, the server transmits the dialing command received from the first communication terminal to the second communication terminal.

In operation S603, the second communication terminal dials a telephone number based on the dialing instruction in the dialing command.

Next, in operation S604, the second communication terminal transmits a dialing response message to the server.

In operation S605, the server transmits the dialing response message to the first communication terminal.

In operation S606, the first communication terminal displays a dialing connection interface based on the dialing response message. Furthermore, the first communication terminal may reproduce a dial tone.

Figure 7:
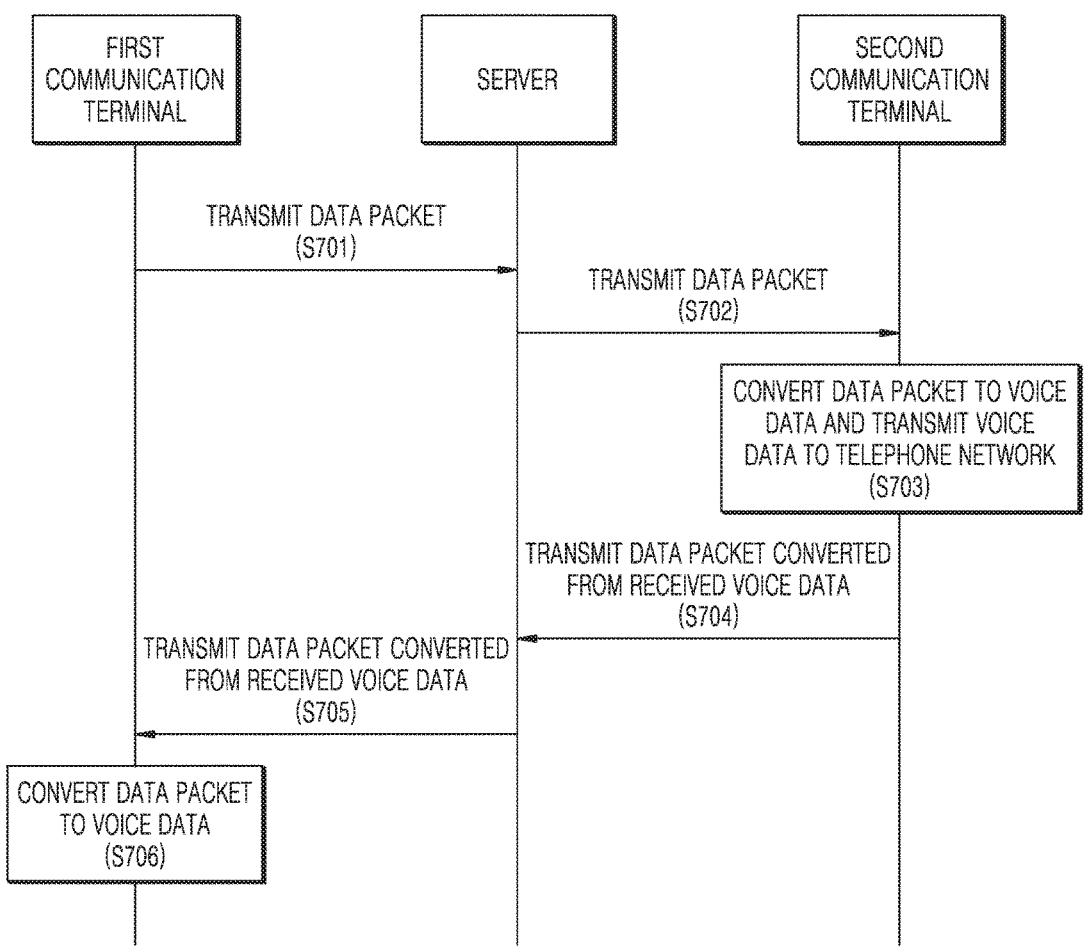
FIG. 7 is a diagram for describing a communication procedure of a first communication terminal for making a phone call by using a second communication terminal, according to some embodiments of the present disclosure.

FIG. 7 is a diagram for describing a communication procedure of a first communication terminal for making a phone call by using a second communication terminal, according to some embodiments of the present disclosure.

In operation S701, a first communication terminal transmits a data packet of a voice call to a server. The first communication terminal may digitize a voice received via a microphone in order to obtain a data packet of a voice call.

In operation S702, the server transmits the data packet received from the first communication terminal to the second communication terminal.

In operation S703, the second communication terminal converts the data packet received from the server and transmits the converted data packet to a telephone network based on a corresponding communication protocol.

In operation S704, the second communication terminal converts a voice received from the telephone network into a data packet and transmits the data packet to the server.

In operation S705, the server transmits the data packet received from the second communication terminal to the first communication terminal.

In operation S706, the first communication terminal converts the received data packet into a voice for reproduction.

In the present disclosure, the sequence of performing the operations S701 and S704 is not limited to the above-stated embodiment.

Figure 8:
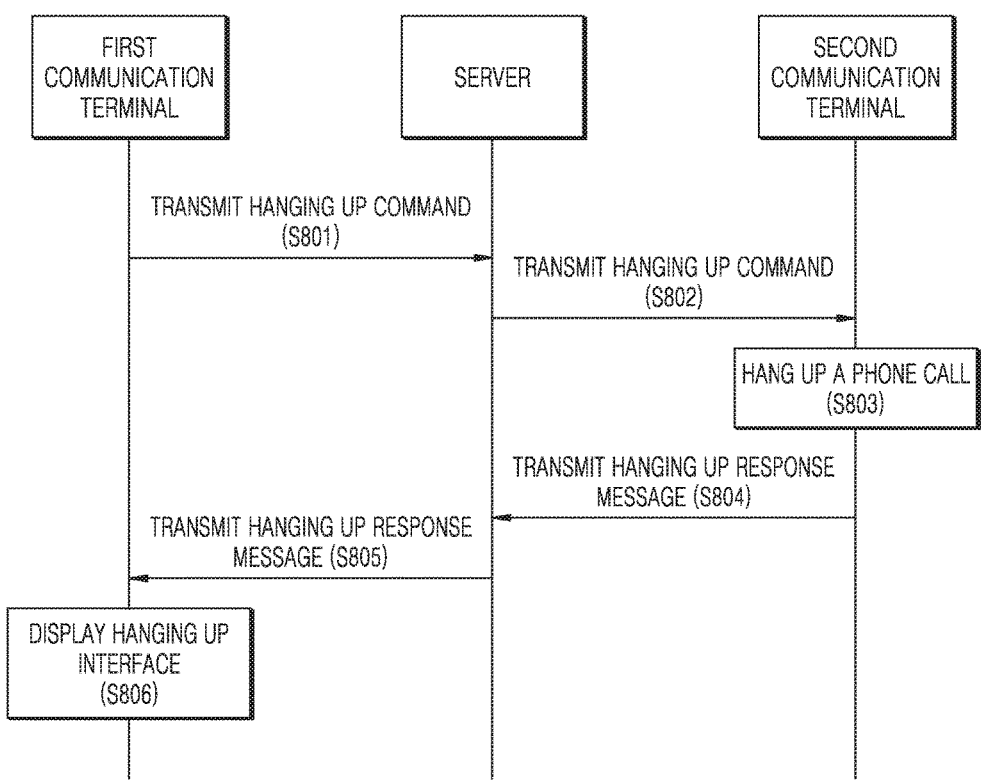
FIG. 8 is a diagram showing a method by which a first communication terminal disconnects a phone call by using a second communication terminal, according to some embodiments of the present disclosure.

FIG. 8 is a diagram showing a method by which a first communication terminal disconnects a phone call by using a second communication terminal, according to some embodiments of the present disclosure.

In operation S801, the first communication terminal transmits a hanging up command to a server. For example, a hanging up command may be generated in response to a hanging up operation performed at the first communication terminal.

In operation S802, the server transmits the hanging up command received from the first communication terminal to the second communication terminal.

In operation S803, the first communication terminal hangs up a current call based on the hanging up command.

Next, in operation S804, the second communication terminal transmits a hanging up response message to the server.

In operation S805, the server transmits the hanging up response message to the first communication terminal.

In operation S806, the first communication terminal displays a hanging up interface based on the hanging up response message.

Figure 9:
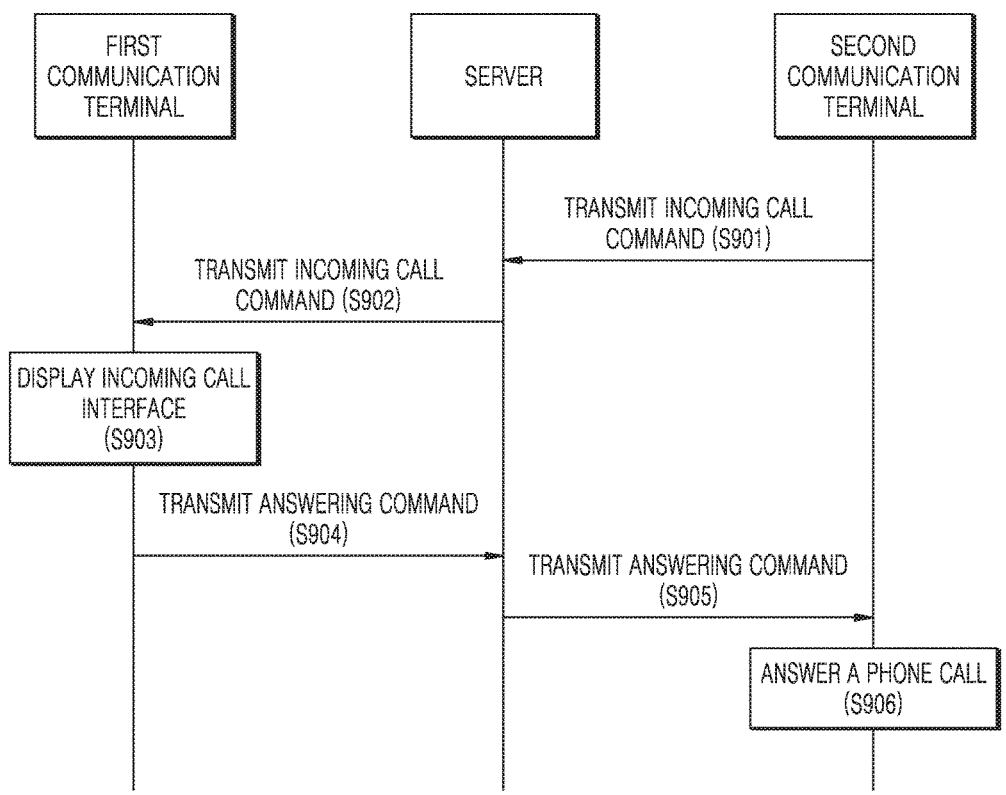
FIG. 9 is a diagram for describing a method by which a first communication terminal receives a phone call by using a second communication terminal, according to some embodiments of the present disclosure.

FIG. 9 is a diagram for describing a method by which a first communication terminal receives a phone call by using a second communication terminal, according to some embodiments of the present disclosure.

In operation S901, when the first communication terminal receives a call request, it transmits an incoming call command to the server. The incoming call command may include an incoming call order. Furthermore, the incoming call command may include a telephone number from which a call request is received.

In operation S902, the server transmits an incoming call command received from the second communication terminal to the first communication terminal.

In operation S903, the second communication terminal displays an incoming call interface based on the incoming call order in the incoming call command. Furthermore, the second communication terminal may reproduce a ringing tone. When the incoming call command includes a telephone number from which a call request is received, the telephone number may be displayed in the incoming call interface.

In operation S904, the first communication terminal transmits an answering command to the server. The answering command may be generated in response to an answering operation performed at the first communication terminal.

In operation S905, the server transmits an answering command to the second communication terminal.

In operation S906, the second communication terminal answers a phone call based on the answering command. Next, the communication procedure shown in FIG. 7 may be performed.

Furthermore, the first communication terminal may transmit an answering rejection command to the second communication terminal. The answering rejection command may be generated in response to an answering rejection operation performed at the first communication terminal. The second communication terminal rejects a phone call based on the answering rejection command. From the above description, the flowcharts shown in FIGS. 6 through 9 show that, when the server transmits data transmitted from the first communication terminal to the second communication terminal or transmits data transmitted from the second communication terminal to the first communication terminal, address conversion may be performed based on additional identification information included in the data. Furthermore, according to some embodiments, identification information regarding the first communication terminal may be a Bluetooth address of a Bluetooth module embedded in the first communication terminal, whereas the identification information regarding the second communication terminal may be a Bluetooth address of a Bluetooth module embedded in the second communication terminal. Furthermore, according to some embodiments, when the first communication terminal performs data interaction with the second communication terminal, the first communication terminal may transmit data to the Bluetooth address of the second communication terminal and the second communication terminal may transmit data to the Bluetooth address of the first communication terminal. When a Bluetooth communication is interrupted and may not be continuously connected, according to some embodiments of the present disclosure, the Bluetooth address may be continuously used to perform a data interaction, and the server may convert the Bluetooth address to an address for long-range wireless communication (e.g., an IP address). In this case, data to be transmitted from the first communication terminal to the second communication terminal may further includes the Bluetooth address of the second communication terminal, whereas data to be transmitted from the second communication terminal to the first communication terminal may further include the Bluetooth address of the first communication terminal.

Figure 10:
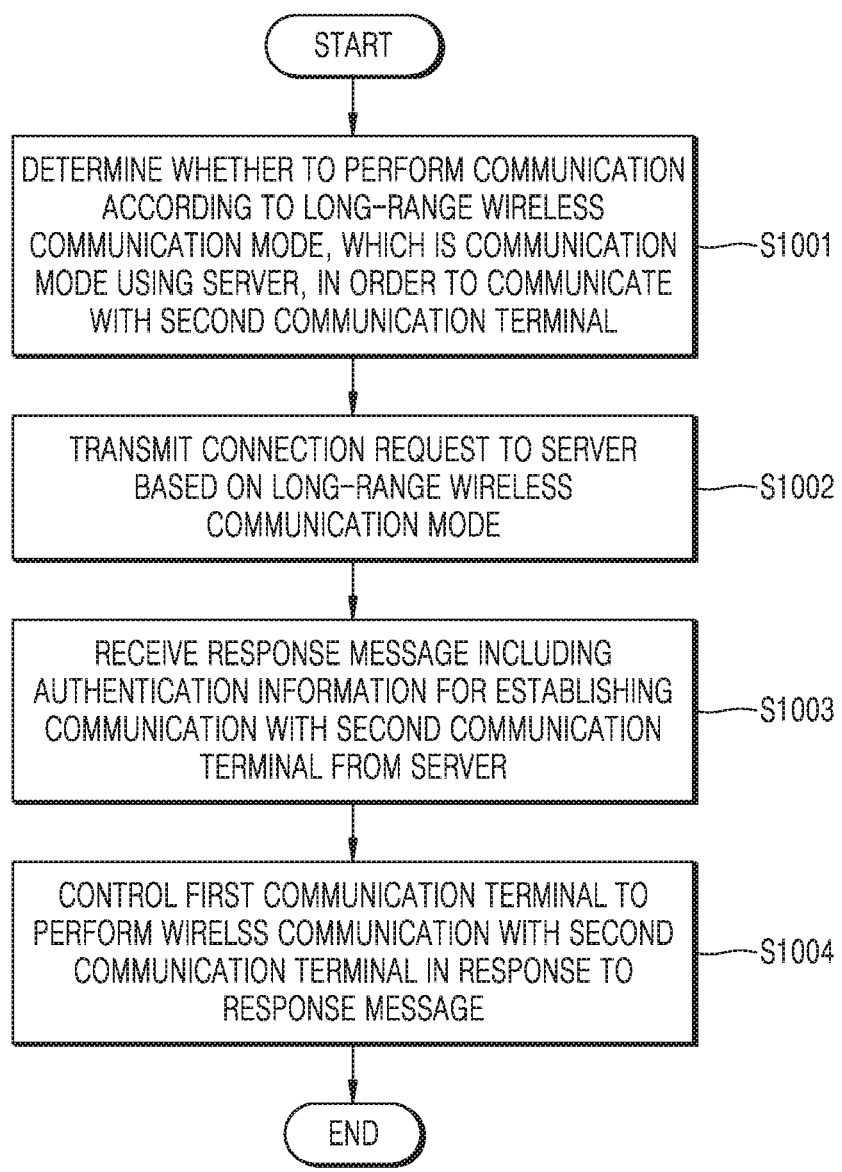
FIG. 10 is a flowchart of a method of performing wireless communication between communication terminals via a server, according to some embodiments of the present disclosure.

FIG. 10 is a flowchart of a method of performing wireless communications between communication terminals via a server, according to some embodiments of the present disclosure.

In operation S1001, the first communication terminal determines whether to perform a communication according to a long-range wireless communication mode, which is a communication mode using a server, in order to communicate with the second communication terminal.

In operation S1002, the first communication terminal transmits a connection request to the server based on the long-range wireless communication mode. At this time, the connection request includes identification information regarding the second communication terminal and identification information regarding the first communication terminal, where the identification information regarding the first communication terminal may include identification information for the short-range wireless communication or long-range wireless communication of the first communication terminal.

In operation S1003, the first communication terminal receives a response message including authentication information for connecting a communication with the second communication terminal from the server. At this time, the authentication information may include information regarding an authentication result determined based on whether the first communication terminal is included in a list of trusted devices of the second communication terminal. Meanwhile, the list of trusted devices of the second communication terminal may include information regarding communication terminals that have previously performed short-range wireless communication with the second communication terminal.

In operation S1004, the first communication terminal performs wireless communication with the second communication terminal in response to the response message.

Figure 11:
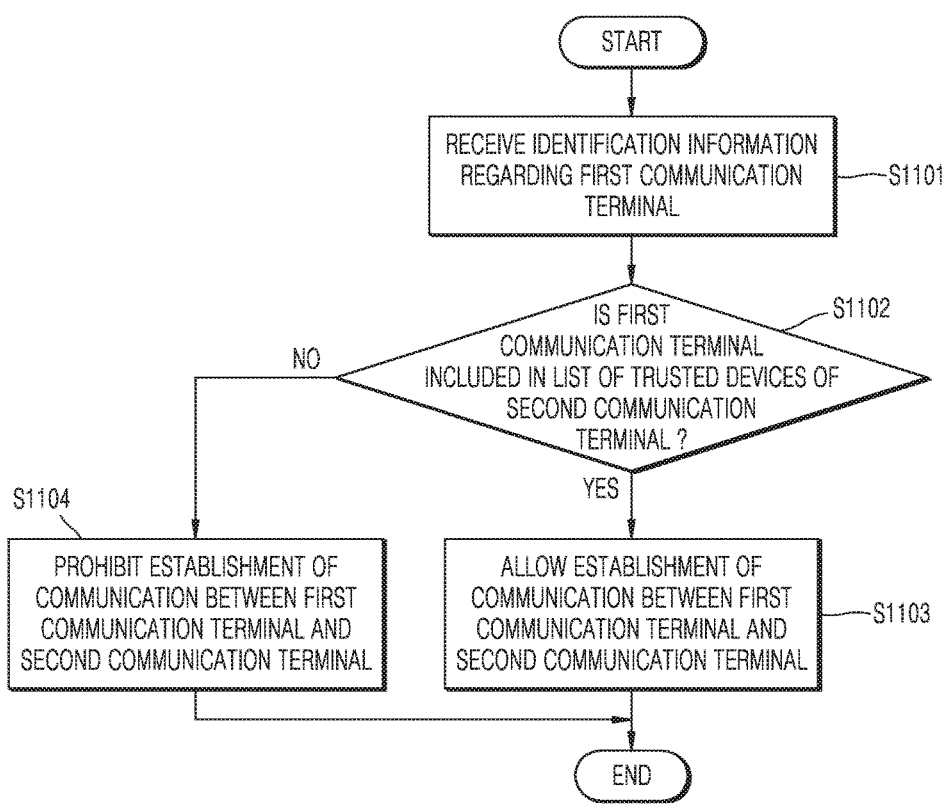
FIG. 11 is a flowchart of an authentication method for performing wireless communication between communication terminals, according to some embodiments of the present disclosure.

FIG. 11 is a flowchart of an authentication method for performing wireless communication between communication terminals, according to some embodiments of the present disclosure.

According to some embodiments, the first communication terminal and the second communication terminal may perform authentication to perform wireless communication. At this time, the authentication may be performed in a predetermined server or the second communication terminal.

In operation S1101, the device in which the authentication is performed receives identification information regarding the first communication terminal.

In operation S1102, the device in which authentication is performed determines whether the first communication terminal is included in a list of trusted devices of the second communication terminal.

When the first communication terminal is included in the list of trusted devices, operation S1103 is performed. Otherwise, operation S1104 is performed.

In operation S1103, the device in which authentication is performed allows a connection of communication between the first communication terminal and the second communication terminal.

In operation S1104, the device in which the authentication is performed prohibits connection of communication between the first communication terminal and the second communication terminal.

Figure 12:
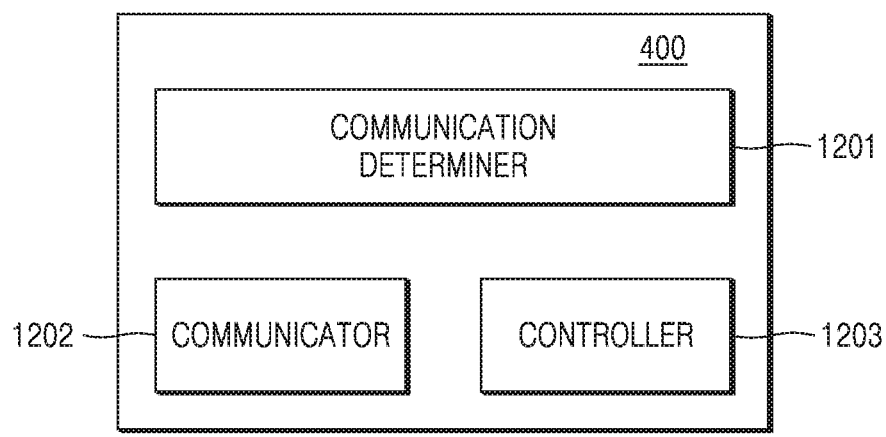
FIG. 12 is a block diagram showing a communication terminal for performing wireless communication through a server, according to some embodiments of the present disclosure.

FIG. 12 is a block diagram showing a communication terminal for performing wireless communication through a server, according to some embodiments of the present disclosure.

The first communication terminal 1200 may include a communication determiner 1201, a communicator 1202, and a controller 1203.

In order to communicate with the second communication terminal, the communication determiner 1201 may determine whether to perform communication according to a long-range wireless communication mode, which is a communication mode using the server. Furthermore, the communication determiner 1201 may determine whether to perform the long-range communication mode when there is data that needs to be transmitted to the second communication terminal or when the second communication terminal is disconnected.

The communicator 1202 may transmit a connection request to the server and receive a response message including authentication information for communication connection with the second communication terminal from the server, based on the long-range wireless communication mode. Furthermore, the communicator 1202 may transmit a control signal of the second communication terminal based on a user input to the server and receive a response message from the server. Here, the response message may include a result of performing at least some of functions of the second communication terminal, according to the control signal. For example, the at least some of the functions include one of a call transmitting function, a call receiving function, and a message transmitting/receiving function. The communicator 1202 may transmit a data packet converted from a voice signal to the server and receive a data packet generated by transmitting a voice signal received from a telephone network by the second communication terminal from the server. Furthermore, the communicator 1202 may communicate with the server in response to the second communication terminal logging into the server based on account information and may perform data interaction with the second communication terminal through the server.

The controller 1203 may control the first communication terminal to perform a wireless communication with the second communication terminal in response to the response message.

Furthermore, according to some embodiments, the first communication terminal 1200 may further include an authenticator. Here, the authenticator may log into the server based on the account information in the long-range wireless communication mode.

Furthermore, according to some embodiments, the first communication terminal 1200 may further include a converter. Here, the converter may convert a voice signal into a data packet and convert a data packet into a voice signal.

Figure 13:
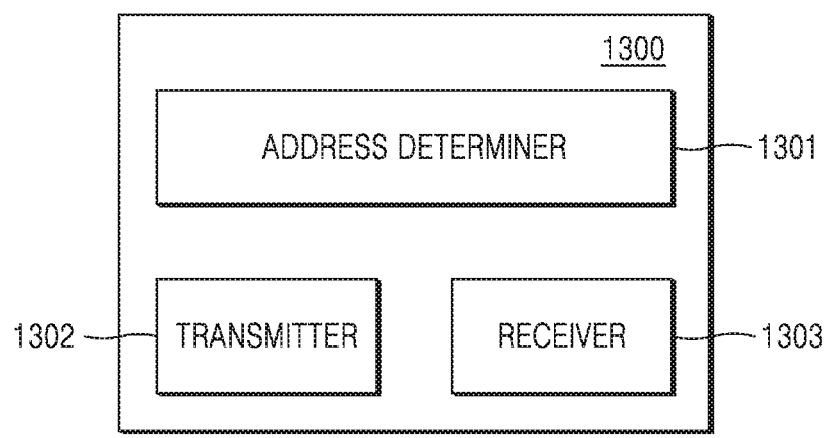
FIG. 13 is a block diagram showing a server used to perform wireless communication between communication terminals, according to some embodiments of the present disclosure.

FIG. 13 is a block diagram showing a server used to perform wireless communications between communication terminals, according to some embodiments of the present disclosure.

A server 1300 may include an address determiner 1301, a transmitter 1302, and a receiver 1303.

The address determiner 1301 may determine a network address of the second communication terminal based on a connection request.

The transmitter 1302 may transmit the connection request to the second communication terminal based on the determined network address and may transmit a response message to the first communication terminal.

The receiver 1303 may receive a connection request from the first communication terminal and receive a response message from the second communication terminal. Furthermore, the receiver 1303 may transmit a connection request including authentication information to the second communication terminal.

Furthermore, according to some embodiments, the server 1300 may further include an authenticator. Specifically, the authenticator may authenticate a communication connection and generate authentication information based on whether the first communication terminal is included in a list of trusted devices of the second communication terminal.

According to a method and an apparatus for wireless communication between communication terminals, according to some embodiments of the present disclosure, seamless communication between different communication terminals may be embodied. Furthermore, according to a method and an apparatus for wireless communication between communication terminals, according to some embodiments of the present disclosure, communication terminals, such as accessory devices (e.g., smart wearable devices), may communicate with communication terminals, such as master devices.

The present disclosure may be implemented by a computer-readable recording medium, such as a program module executed by a computer. The computer-readable recording medium may be an arbitrary available medium accessible by a computer, and examples thereof include all volatile media (e.g., RANI) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

The invention claimed is:

1. A first communication terminal performing wireless communication with a second communication terminal, the first communication terminal comprising:
   a communication determiner configured to determine whether to communicate in a long-range wireless communication mode, which is a communication mode for communicating with the second communication terminal by using a server;
   a transceiver configured to, based on a determination to communicate in the long-range wireless communication mode, transmit a connection request to the server and receive a response message including authentication information for establishing communication with the second communication terminal from the server; and
   at least one processor configured to control the first communication terminal to perform wireless communication with the second communication terminal in response to the response message,
   wherein the authentication information comprises information regarding a result of authentication determined based on whether the first communication terminal is included in a list of trusted devices of the second communication terminal, and
   wherein the at least one processor is further configured to control the transceiver to transmit a control signal of the second communication terminal based on a user input to the server, and the response message comprises information regarding a result of performing at least one function of the second communication terminal based on the control signal.

2. The first communication terminal of claim 1,
   wherein the connection request comprises identification information regarding the second communication terminal and identification information regarding the first communication terminal, and
   wherein the identification information regarding the first communication terminal comprises authentication information for short-range wireless communication and/or long-range wireless communication of the first communication terminal.

3. The first communication terminal of claim 1, wherein the list of trusted devices of the second communication terminal comprises information regarding communication terminals that have previously performed short-range wireless communication with the second communication terminal.

4. The first communication terminal of claim 1, wherein the at least one function comprises a phone call transmitting function, a phone call receiving function, a message transmitting function, or a message receiving function.

5. The first communication terminal of claim 1, further comprising:
a converter configured to convert a voice signal to a data packet and convert a data packet to a voice signal,
wherein the transceiver is further configured to transmit the data packet converted from the voice signal to the server and receive a data package converted from a voice signal by the second communication terminal from the server.

6. The first communication terminal of claim 1, wherein the communication determiner is further configured to determine whether to communicate in the long-range wireless communication mode when there is data that needs to be transmitted to the second communication terminal or when the second communication terminal is disconnected.

7. The first communication terminal of claim 1,
wherein the at least one processor is further configured to control the transceiver to request the server to authenticate the first communication terminal by transmitting account information,
wherein the transceiver is further configured to perform data interaction with the second communication terminal authenticated by the server via the server.

8. A method by which a first communication terminal performs wireless communication with a second communication terminal, the method comprising:
determining whether to communicate in a long-range wireless communication mode, which is a communication mode for communicating with the second communication terminal by using a server;
based on a determination to communicate in the long-range wireless communication mode, transmitting a connection request to the server;
receiving a response message to the connection request, the response message including authentication information for establishing communication with the second communication terminal from the server; and
controlling the first communication terminal to perform wireless communication with the second communication terminal in response to the response message,
wherein the authentication information comprises information regarding a result of authentication determined based on whether the first communication terminal is included in a list of trusted devices of the second communication terminal,
wherein, in the transmitting, a control signal of the second communication terminal based on a user input is transmitted to the server, and
wherein the response message comprises information regarding a result of performing at least one function of the second communication terminal based on the control signal.

9. The method of claim 8,
wherein the connection request comprises identification information regarding the second communication terminal and identification information regarding the first communication terminal, and
wherein the identification information regarding the first communication terminal comprises authentication information for short-range wireless communication and/or long-range wireless communication of the first communication terminal.

10. The method of claim 8, wherein the list of trusted devices of the second communication terminal comprises information regarding communication terminals that have previously performed short-range wireless communication with the second communication terminal.

11. The method of claim 8, further comprising transmitting a data packet converted from a voice signal to the server;
receiving a data package converted from a voice signal by the second communication terminal from the server; and
converting the data packet received from the server to a voice signal.

12. The method of claim 8, wherein the determining of whether to communicate in the long-range wireless communication mode comprises determining whether to communicate in the long-range wireless communication mode when there is data that needs to be transmitted to the second communication terminal or when the second communication terminal is disconnected.

13. The method of claim 8, further comprising:
requesting the server to authenticate the first communication terminal by transmitting account information; and
performing data interaction with the second communication terminal authenticated by the server via the server.

* * * * *